Patented Apr. 4, 1944

2,345,575

UNITED STATES PATENT OFFICE 2,345,575

PROCESS OF PREPARING GASOLINE OF LOW GUM-FORMING TENDENCY

Robert E. Burk and Everett C. Hughes, Cleveland Heights, Ohio, assignors to The Standard Oil Company, Cleveland, Ohio, a corporation of Ohio No Drawing. Application December 9, 1940, Serial No. 369,289

4 Claims. (Cl. 196—36)

Gasolines such as gasolines which have been raised in knock rating by passing over aromatizing catalysts, catalytically cracked gasolines, polymerized gasolines, and frequently even thermally cracked gasolines, contain especially sensitive compounds, including diolefins, styrenes, etc., which have a tendency to form gum. Various anti-gum addition agents have been proposed and are in use, but fundamentally it is desirable to obviate the difficulty without necessity of resort to addition of chemical agents, which have a tendency to introduce other difficulties. We have found that suitable procedure results in the sensitive gum-forming compounds being changed in process of manufacture to useful components instead of being wasted, and such action may be effected selectively without detriment to other desired constituents.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The naphtha produced in a manner as above-indicated as to contain sensitive gum-forming components, is, with properly adjusted conditions, subjected to controlled catalytic action in the presence of hydrogen-containing gas, as for example conveniently from aromatizing treatment. We have found that where subjecting an aromatized naphtha for instance to the action of a highly efficient or active catalyst with the intention of selectively attacking the gum-forming components, the temperature must be adjusted to a range lower than that in which the aromatization has been effected, but on the contrary where attacking the gum-forming components with a catalyst of weakly active or weakly hydrogenating character, the temperature range is adjusted with more particular reference to selective action on the objectionable diolefins etc. with respect to flow rate etc., and while generally higher, may be lower, such catalysts not having the inherent tendency to affect the aromatic hydrocarbons as is the case with the said highly active catalysts. Thus, for instance in treating naphtha by catalyzing in contact with a co-precipitated 80:20 aluminum:chromium oxide catalyst for aromatizing, and then treating the product including the gas with a highly active catalyst of the same order, for conditions to selectively hydrogenate the gum-forming components the temperature of such second stage treatment is to be reduced, as below 900°, but above about 580° F. Under these adjusted conditions, hydrogen present is selectively combined with the gum-forming components, such as diolefins, without affecting desirable olefins and aromatics. Highly active catalysts for attacking gum-forming constituents under such conditions we have found to be catalysts of co-precipitated gel type oxides of aluminum and chromium with 70 to 82 mol per cent of aluminum oxide and 18 to 30 mol per cent of chromium oxide; and as indicated, by adjustment of the equilibrium conditions for this second stage operation, the hydrogen provided in the gas produced by the aromatizing stage, or added if preferred, may be selectively directed to the treatment of the sensitive gum-forming components without effect upon the valuable olefins and aromatics.

As an example of gasoline production with elimination of gum-forming constituents: A naphtha distilled from Illinois crude petroleum is passed, together with three mols of hydrogen per mol of naphtha through a catalyst mass of co-precipitated gel type 80 mol per cent $Al_2O_3$ and 20 mol per cent $Cr_2O_3$ (as in our application Serial No. 297,414) the temperature being 1020–1030° F. and pressure 100 pounds per square inch, with flow rate of 0.98 volume per volume of catalyst per hour. From this aromatizing catalyst section, the products including hydrogen-containing gas are passed through a succeeding catalyst section with catalyst of the same composition, but maintained at a relatively low temperature, viz., about 820° F. to attack formed gum-producing constituents. The bromine number of the final product as contrasted with that from the first stage or aromatizing stage only, is reduced by about seven units, and the Kattwinkel test is 52, while the A. S. T. M. octane number is 80.4, the weight of coke 1.8 per cent, and the weight of residue about 2.4 per cent. The Kattwinkel test is noticed as being particularly low with such a high octane rate, thus indicating the cut-down in high unsaturated compounds, and this naphtha finished up as a commercial gasoline showed a dissolved gum content of 2.0 mg. and an induction test period of 8¼ hours. In contrast, where operation was carried on as in the foregoing except that the temperature in the succeeding catalyst section for operation on the diolefins was maintained at 1025° F., the product showed a Kattwinkel test of 58 to A. S. T. M. octane number 80.1, and the finished gasoline had 3.6 mg. of dissolved gum and an induction period of only 3 hours.

Instead of subjecting the products of the first or aromatizing stage to a highly efficient catalyst at lower temperature, we have found that a weaker or less active type of catalyst may be substituted, if the temperature range be high. Thus, catalysts of molybdenum, iron, cobalt, chromium, copper, uranium, in the form of a metal or oxide or sulphide, and invidual or mixed, may be employed, the temperature preferably being elevated, or maintained in the range as for aromatizing. This possibility of distinct differences in catalytic adjustment is quite unexpected.

It is especially noticed that in accordance with our invention, in any case, operating conditions for selective attack upon gum-forming components are adjusted such that either particularly conveniently the same catalyst may be used as is used in the aromatizing or first stage, the temperature being lowered for the selective action upon the diolefins, etc.; or a less active catalyst, such as iron, cobalt, etc., may be used, with suitably adjusted condition. At a relatively elevated temperature, control is obtained on account of equilibrium considerations. Catalysts and temperatures, respectively correlated and adjusted, as in accordance with our process, thus make possible continuous convenient manufacturing schedules eliminating detrimental gum-forming tendency, without loss of desirable fuel components.

Other modes of applying the principle of the invention may be employed, change being made as regards the details described, provided the features stated in any of the following claims, or the equivalent of such, be employed.

We therefore particularly point out and distinctly claim as our invention:

1. A process of preparing gasoline, which comprises subjecting a naphtha to aromatizing by a catalyst of co-precipitated 80:20 gel type Al:Cr oxides at a temperature of 750–1200° F. and 40–180 pounds per square inch pressure in the presence of hydrogen to produce an aromatized product containing gum-forming constituents, and then selectively attacking the gum-forming constituents by subjecting the aromatized product containing such constituents to the presence of hydrogen and the same composition catalyst at a temperature below 900° F. but above 580° F.

2. A process of preparing gasoline, which comprises subjecting a naphtha to aromatizing by a catalyst of co-precipitated 80:20 gel Al:Cr oxides at a temperature of 750–1200° F. and 40–180 pounds per square inch pressure in the presence of hydrogen to produce an aromatized product containing gum-forming constituents, and then selectively attacking the gum-forming constituents by subjecting the aromatized product containing such constituents in the presence of hydrogen to a catalyst of co-precipitated gel 70 to 82 mol per cent of aluminum oxide and 18 to 30 mol per cent of chromium oxide at a temperature below 900° F. but above 580° F.

3. A process of preparing gasoline, which comprises subjecting a naphtha to aromatizing by a catalyst of co-precipitated gel 70 to 82 mol per cent of aluminum oxide and 18 to 30 mol per cent of chromium oxide at a temperature of 750–1200° F. and 40–180 pounds per square inch pressure in the presence of hydrogen to produce an aromatized product containing gum-forming constituents, and then selectively attacking the gum-forming constituents by subjecting the aromatized product containing such gum-forming constituents in the presence of hydrogen to a catalyst of co-precipitated 80:20 gel Al:Cr oxides at a temperature below 900° F. but above 580° F.

4. A process of preparing gasoline, which comprises subjecting a naphtha to aromatizing by a catalyst of co-precipitated gel 70 to 82 mol per cent of aluminum oxide and 18 to 30 mol per cent of chromium oxide at a temperature of 750–1200° F. and 40–180 pounds per square inch pressure in the presence of hydrogen to produce an aromatized product containing gum-forming constituents, and then selectively attacking the gum-forming constituents by subjecting the aromatized product containing such gum-forming constituents in the presence of hydrogen to a catalyst of co-precipitated gel 70 to 82 mol per cent of aluminum oxide and 18 to 30 mol per cent of chromium oxide at a temperature below 900° F. but above 580° F.

ROBERT E. BURK.
EVERETT C. HUGHES.